(12) United States Patent
Leyendecker

(10) Patent No.: US 6,253,062 B1
(45) Date of Patent: Jun. 26, 2001

(54) VOICE INFORMATION SERVICE NETWORKING SYSTEM

(75) Inventor: Robert Richard Leyendecker, Blaine, WA (US)

(73) Assignee: Glenayre Electronics, Inc., Charlotte, NC (US)

(*) Notice: Subject to any disclaimer, the term of this patent is extended or adjusted under 35 U.S.C. 154(b) by 0 days.

(21) Appl. No.: 09/167,959

(22) Filed: Oct. 6, 1998

(51) Int. Cl.[7] ........................................... H04Q 7/00
(52) U.S. Cl. .................... 455/31.2; 455/426; 379/88.26; 340/825.44
(58) Field of Search ................. 340/905, 825.44; 455/31.2, 31.3, 426, 412; 379/88.11, 88.22, 88.12, 88.13, 88.14, 88.15, 88.25, 88.26

(56) References Cited

U.S. PATENT DOCUMENTS

| | | | |
|---|---|---|---|
| 4,812,843 | * | 3/1989 | Champion, III et al. ............ 340/905 |
| 5,479,491 | * | 12/1995 | Herrero Garcia et al. ............ 379/88 |
| 5,555,446 | * | 9/1996 | Jasinski ................................ 455/54.2 |
| 5,579,535 | * | 11/1996 | Orlen et al. ........................... 455/33.1 |
| 5,717,741 | * | 2/1998 | Yue et al. .............................. 379/67 |
| 5,835,026 | * | 11/1998 | Wicks et al. ......................... 340/905 |
| 5,850,190 | * | 12/1998 | Wicks et al. ......................... 340/905 |
| 6,014,428 | * | 1/2000 | Wolf .................................. 379/88.11 |

* cited by examiner

*Primary Examiner*—Edward F. Urban
*Assistant Examiner*—Blane J. Jackson
(74) *Attorney, Agent, or Firm*—Christensen O'Connor Johnson Kindness PLLC

(57) ABSTRACT

A system for distributing voice information service messages (VISMs) to subscribers through their voice pagers is provided with a voice information service workstation where VISMs are recorded, and a voice information service terminal which converts the VISMs into voice pages and transfers them into a voice paging network for distribution to subscribers' voice pagers. The system may be accessed by subscribers via telephone, computer, or voice pager for changing personal settings.

13 Claims, 4 Drawing Sheets

VOICE INFORMATION SERVICE NETWORKING SYSTEM

FIELD OF THE INVENTION

The present invention relates generally to paging systems, and more particularly to paging systems that are adapted to receive information from information services providers such as voice messages which are automatically delivered to subscribers.

BACKGROUND OF THE INVENTION

Prior art paging systems are used to send electronic notices, or pages, to subscribers informing them that they have been called by other persons. Typical paging systems include a wireless messaging system with a paging terminal and one or more paging stations. The paging terminal is connected to the publicly switched telephone network and is configured to receive incoming calls from persons who wish to contact subscribers of the system. In response to receiving a call, the paging terminal creates a page for the subscriber, which is forwarded to the paging stations where the page is transmitted to the subscribers' pagers. When the pagers receive pages directed to them, they alert their respective subscribers of the incoming pages. Usually these alerts are in the form of a audio buzzing or a silent vibration, and are commonly accompanied by a displayed message on an alphanumeric display.

Older paging systems employed one-way pagers, which could only receive pages. In order for subscribers to acknowledge receipt of the pages or to convey other information, they would contact the senders through other systems, such as conventional telephones. Modern paging systems often employ two-way pagers which can not only receive pages, but may also acknowledge receipt of pages as well as transmit other information back to the paging stations.

A recent embodiment of modern paging systems is the voice paging system, in which a recorded voice message forms part of the page.

Most voice paging systems operate by allowing a caller to communicate a voice message to a recipient using a combination of digital "land-line" or satellite networking and analog radio frequency transmissions from the caller to the recipient's voice pager.

In a typical system, a caller dials a recipient's assigned phone number and records a message on a voice paging terminal (VPT). This message is automatically forwarded from the VPT to a voice paging message router (VPMR). The VPMR determines which voice paging base station (VPBS) is in broadcast range of the recipient and proceeds to forward the message to that VPBS, which then transmits the voice message to the recipient's voice pager over an RF communication path known as a forward channel.

In conventional two-way messaging systems, a VPBS may also receive communications from voice pagers over an RF communication path known as the reverse channel. Modern two-way paging systems employ voice pagers that can both receive pages as well as acknowledge their receipt. The reverse channel may also be used to transmit other information such as responses to electronic mail messages.

SUMMARY OF THE INVENTION

In accordance with the present invention, a voice paging system for allowing voice information service providers, e.g., organizations which collect and distribute information on news, stock quotes, weather, etc., as voice messages, to distribute information to subscribers through voice pagers is provided.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
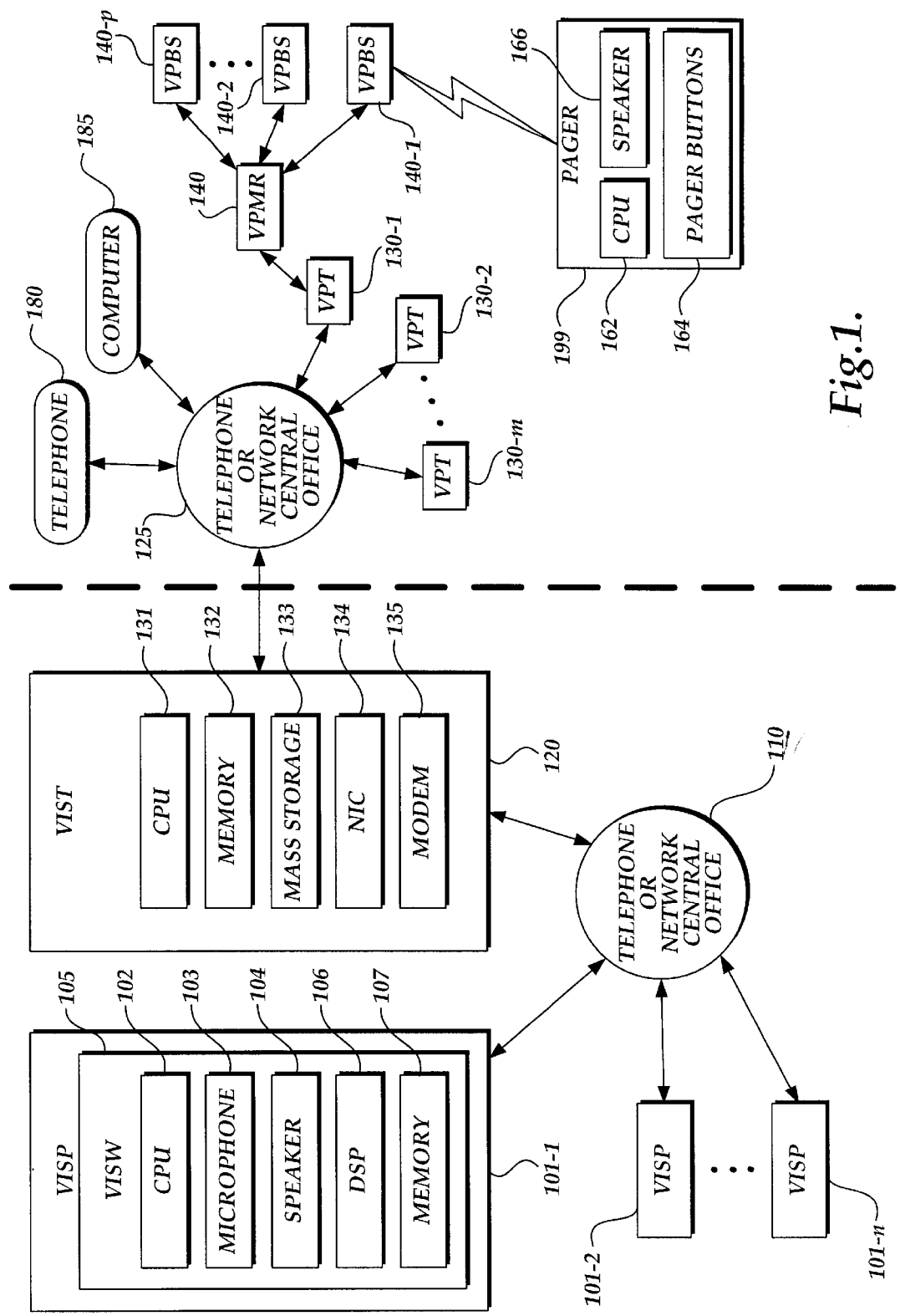
FIG. 1 is a block diagram depicting an overview of the system of the present invention.

Referring to FIG. 1, a system is provided for voice information service providers (VISPs) to distribute collected information in the form of voice pages to their subscribers through the subscriber's voice pagers 199. In the system according to the present invention, any number of voice information service providers, 101-1, 101-2 . . . 101-n, may provide news, stock quotes, sports scores, lottery results, and other types of collected information to their subscribers. Each voice information service provider, such as exemplary VISP 101-1 typically includes a workstation (VISW) 105 having a processor 102, a microphone 104 or other such means to input voice messages into the system, a speaker 103 or other sound reproducing means, a digital signal processing card 106, and memory 107 holding software (not shown) including data compression routines for reducing transmission times and speech enhancement routines for optimizing speech availability. The VISW will typically be a general purpose computing device such as a personal computer, but may be any computing device capable of providing the functionality disclosed herein.

A voice information services terminal (VIST) 120 serves as an interface between VISPs 101-1, 101-2 . . . 101-n, and a voice paging network 10. The VISP communicates with the VIST through a telephone or network central office 110. The VIST 120 consists of hardware and software necessary to accept a voice information service message (VISM), process it, and route it to the appropriate voice paging terminal (VPT) 130-1, 130-2 . . . 130-m for delivering the VISM to a subscriber. A VIST has a connection to each VPT in a Voice Paging Provider (VPP) system, typically through a telephone or network central office 125. The VIST 120 routes the VISM to every VPT in the VPP's voice paging network system 10 using a voice information services network (VISN) protocol. A typical VIST 120 in the system of the present invention includes such components as a processor 131, memory 132, non-volatile mass storage 133, which may include one or more of a hard drive, a floppy drive, a CD ROM, and a digital video disk (DVD-also known as digital versatile disk). VIST 120 will also include such communications interfaces as a network interface card (NIC) 134 and a modem 135.

VISP 101-1 connects to and communicates with the VIST 120 through a telephone or network system 110 using the modem 135 or NIC 134 of VIST 120, respectively.

VIST 120 interfaces into a VPP's Voice Paging Network 10 through a telephone or network system 125 using a modem 135 or NIC 134, respectively, to communicate with a voice paging terminal, such as exemplary VPT 130-1. The Voice Paging Network 10 may be any paging network known in the art that has been modified to handle voice pages. Components for an exemplary paging network are available from Glenayre Electronics, Inc., of Vancouver, British Columbia, Canada, the assignee of the present invention. A typical Voice Paging Network 10 includes voice paging terminals, such as exemplary VPT 130-1, for receiving incoming telephone calls from individuals interested in contacting the subscribers of the paging network. The VPT 130-1, in response to receiving a call, creates a voice page for the subscriber which is forwarded to the Voice Paging Message Router (VPMR) 140. The VPMR 140 determines which Voice Paging Base Station (VPBS) 140-1, 140-2 . . . 140-p is in broadcast range of the subscriber, and forwards the voice page to that VPBS. The VPBS, such as exemplary VPBS 140-1, then transmits the voice page to the voice paging subscriber over an RF communications path conventionally known as the "forward channel." The subscriber receives the voice page through a portable voice paging personal device 199, which is commonly referred to as "voice pager" or simply "pager." The voice pager 199 will typically include a processor 162, speaker 166, and a number of button controls 164. Further details of these and other components of voice paging networks 10 are well known in the art and will not be described in detail herein, as such a detailed description is not necessary for an understanding of the present invention.

Figure 2:
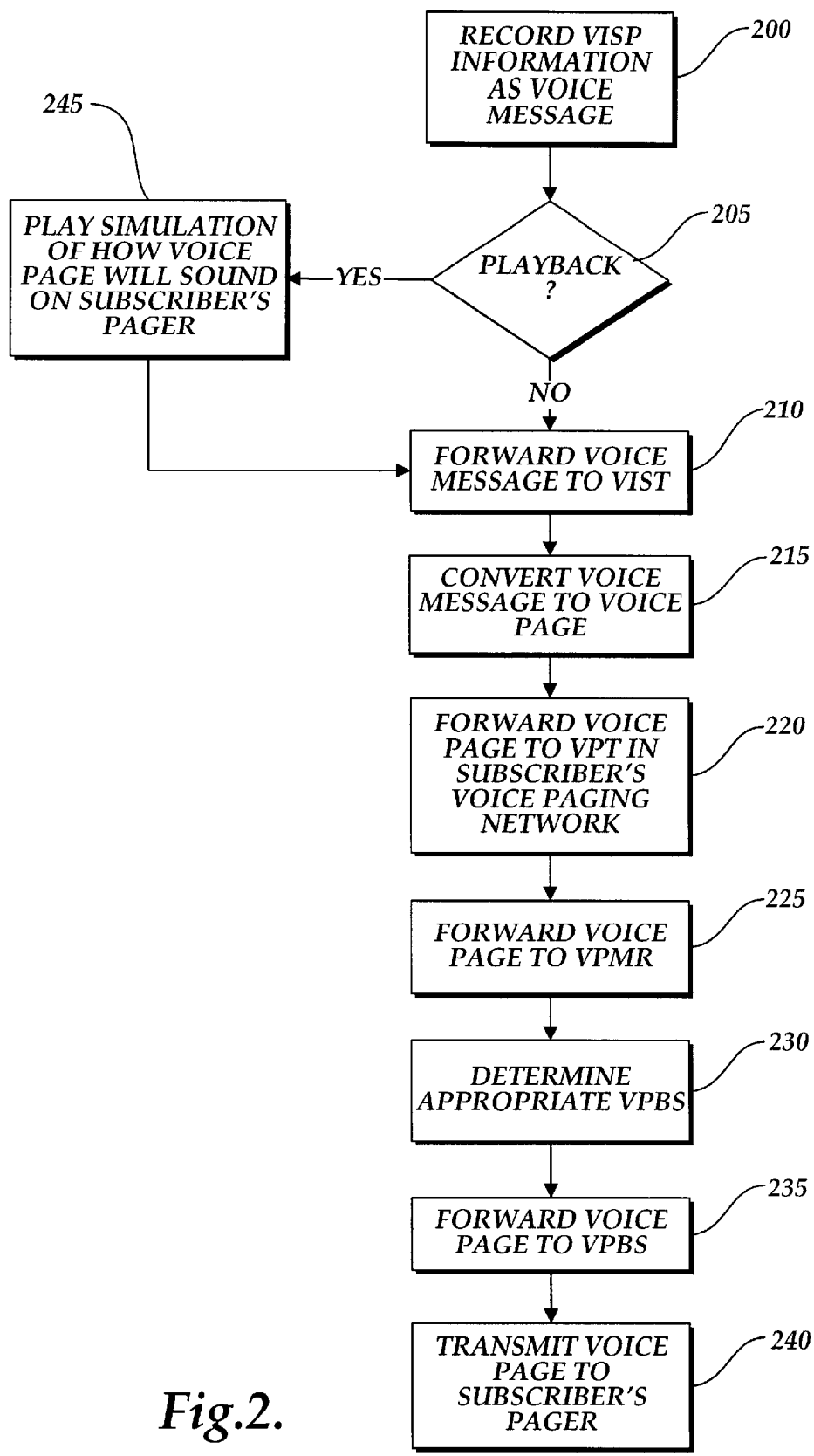
FIG. 2 is a flowchart depicting an operation of the system according to the present invention.

Referring to FIG. 2, according to the present invention, the Voice Information Service Provider (VISP) records information to be distributed to subscribers as voice messages. See block 200. After recording the voice message, a determination is made as to whether the voice message should be played back to the VISP according to a further aspect of the present invention. See block 205. If no playback is desired, the voice message is forwarded to the Voice Information Services Terminal (VIST) at block 210, where the voice message is converted into a voice page. See block 215. The voice page is then forwarded to a voice paging terminal (VPT), the entry point to the subscriber's voice paging network. See block 220.

Once in the voice paging network 10, the voice page is forwarded from the VPT to the Voice Paging Message Router (VPMR), at block 225, which determines which Voice Paging Base Station (VPBS) is in broadcast range of the subscriber. See block 230.

The voice page is then forwarded to the appropriate VPBS at block 235, whereupon the VPBS transmits the voice page to the subscriber's pager. See block 240.

Returning to block 205, the present invention includes the capability for the VISP to play back the voice message. If, at block 205, such a playback is desired, a simulation of how the voice page will sound on the subscriber's pager is played to the VISP through speaker 104 of the VISW 105. See block 245. The simulated voice page may be created using audio simulation, and acoustic, speech and signal processing techniques known in the art. These techniques would typically take into account parameters based on known acoustic properties of the voice paging system, including the speaker 166 of the subscriber's pager, and/or parameters based on expected characteristics derived from mathematical models of the system. These properties may all be reproduced using the DSP card 106 of the VISW 105.

Figure 3:
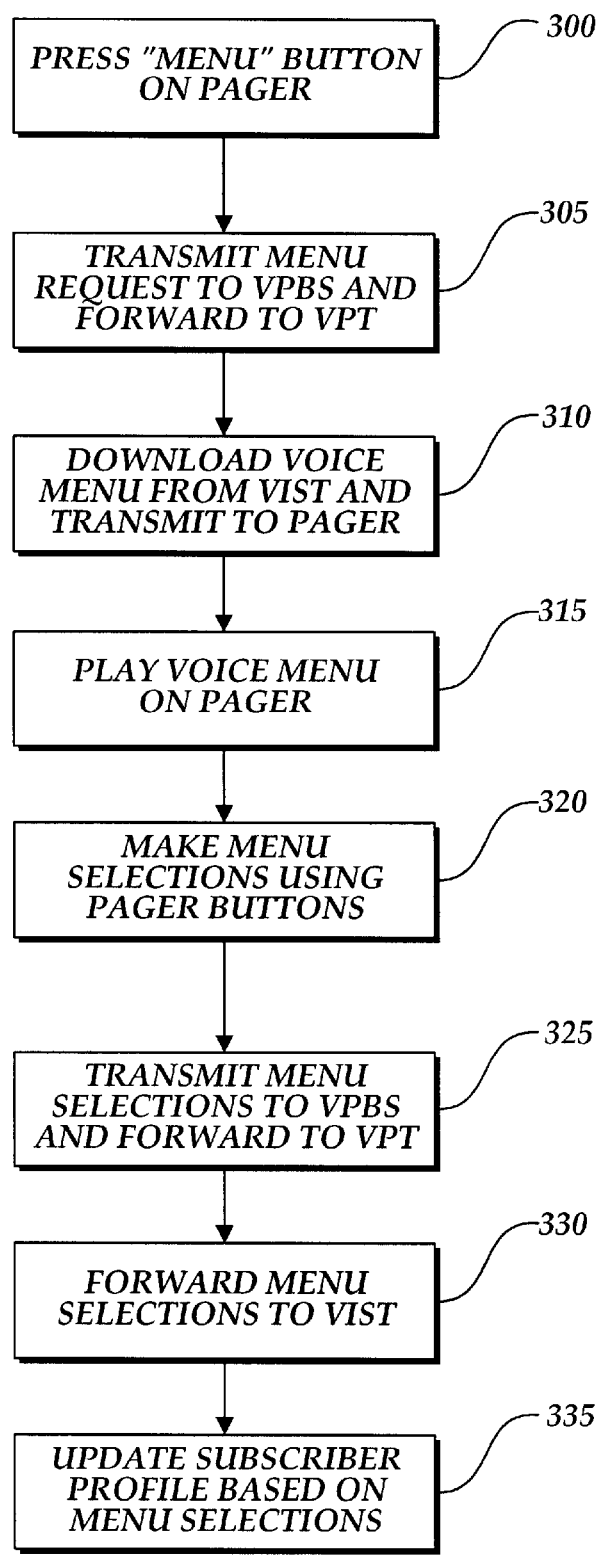
FIG. 3 is a flowchart depicting an operation for modifying system settings according to a first aspect of the present invention.

Referring to FIG. 3, a further aspect of the present invention is depicted in which a subscriber to the system may modify various settings for the subscriber's voice mailbox, including the frequency with which the subscriber receives automatic voice information service messages, and the types of content for these messages among other settings that a VISP may wish for a subscriber to customize. This aspect of the invention may be implemented with two-way voice paging networks.

According to a first aspect of this updating feature, the subscriber presses a menu button on the pager. See block 300. A menu request is transmitted from the voice pager to the VPBS over an RF communications path commonly known as the "reverse channel," and is forwarded to the VPT. See block 305. A voice menu is downloaded from the VIST 120 to the VPT 130-1 and then transmitted to the pager 199, at block 310, and is played back through speaker 166 of the subscriber's pager. See block 315.

After the subscriber has received the voice menu, menu selections are made using the pager buttons 164. See block 320. The menu selections are then sent back to the VPBS and forwarded to the VPT. See block 325. The menu selections are then forwarded to the VIST, at block 330, and the subscriber's profile is updated according to the menu selections. See block 335.

For example, the initial voice menu prompts the subscriber with the message "Press A to delete service; Press B to add service; Press C to end menu." If the subscriber presses "B" for instance, the next voice menu is presented to the subscriber as "Press A to add sports; Press B to add news; Press C to add weather," and so on. Frequency of delivery could be implemented as yet another level of menus after the selection of service such as "Press A for hourly; Press B for daily; Press C for weekly." Other menu organizations may be employed without departing from the spirit of the invention.

Figure 4:
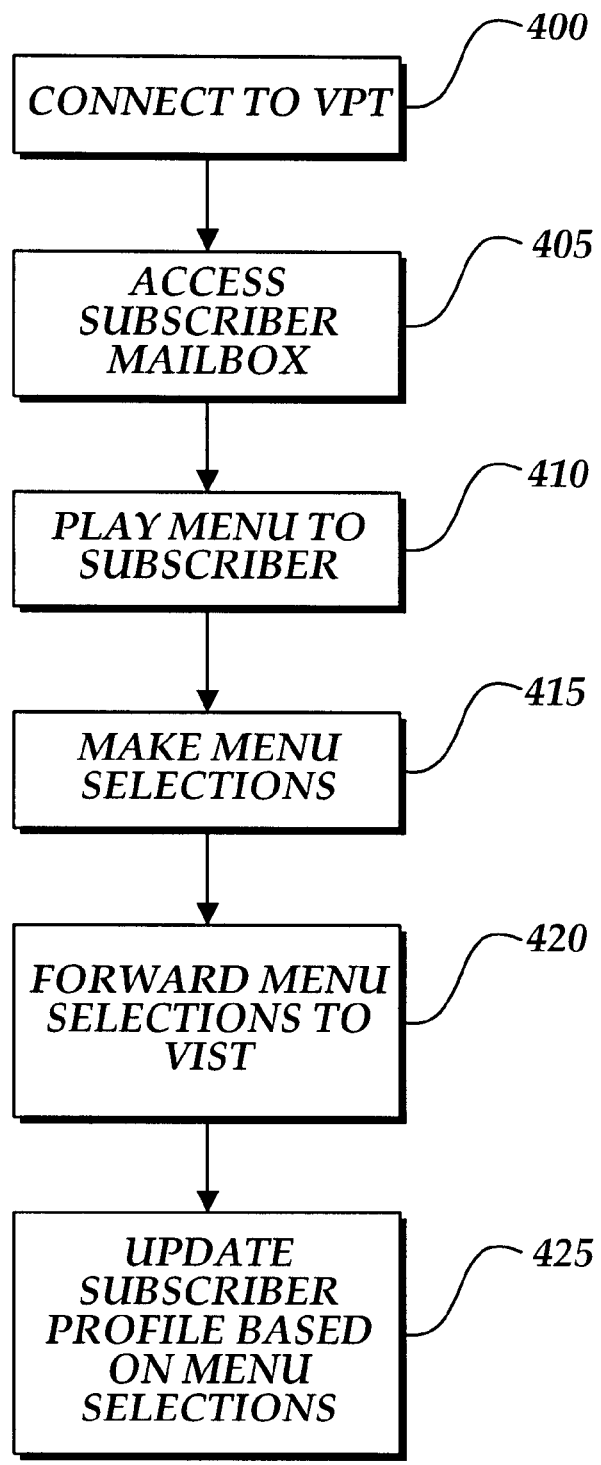
FIG. 4 is a flowchart depicting an operation for modifying system settings according to a second aspect of the present invention.

Referring to FIG. 4, a method is shown for updating a subscriber profile according to another aspect of the present invention. According to this aspect of the present invention, a subscriber connects to a voice paging terminal such as exemplary VPT 130-1 through a conventional telephone or network system 125 using a telephone 180 or computer 185, respectively. See block 400. A subscriber then accesses his or her mailbox, typically by entering a user ID/password combination. See block 405. Upon gaining access to the subscriber's mailbox, a menu, in the form of an interactive voice menu, is played to the subscriber, at block 410, whereupon a subscriber makes various menu selections. See block 415. Since access to the VPT will be through a conventional telephone, or through a network such as the Internet, more buttons will typically be available than on a pager. The interactive menus may offer more selections at each level, such as "Press 1 to add news updates once per hour," "Press 2 for market reports twice per day," Press 3 for sports updates once per hour," "Press 4 to review current information services status and charges," "Press 5 to delete services," and "Press 6 to add new services." However, a simple menu such as discussed above for the pager may be employed as well. Those skilled in the art will appreciate that the menu may also be presented as a textual/graphical menu in addition to or instead of a voice menu. The subscriber's menu selections are then forwarded to the VIST 120, at block 420, and the subscriber profile is updated based on the menu selections. See block 425.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A voice information service provider (VISP) system for distributing information to a subscriber's voice pager through a commercial voice paging network that can be accessed by a caller through a standard telephone carrier and a standard telephone system interface, the VISP system comprising:

a voice information service workstation (VISW), the VISW having a processor, memory, a microphone, and a speaker, the VISP collecting information and creating a record of the information as a voice message on the VISW; and a voice information service terminal (VIST) connected to, and in communication with the VISW and the commercial voice paging network, the VIST for receiving the voice message from the VISW, converting the voice message into a voice page, and transferring the voice page to the commercial voice paging network for distribution to the subscriber through the subscriber's voice pager, the VIST having a direct connection to the commercial voice paging network such that the VIST is not required to access the commercial voice paging network through a standard telephone carrier and a standard telephone system interface.

2. The system of claim 1, wherein creating a record of the information as a voice messages on the VISW comprises one or more of recording the voice message through the microphone, and loading a pre-recorded voice message into the system.

3. The system of claim 1, wherein the VISW further comprises a digital signal processor for playing a simulation, through the speaker, of how the voice page will sound on the subscriber's voice pager.

4. The system of claim 1, wherein:

the VISP system further comprises a subscriber voice mailbox, the subscriber voice mailbox including one or more parameters indicating subscriber preferences, and a menu means for allowing a subscriber to modify the one or more parameters, the menu means including a menu; and the voice paging network comprises a voice paging terminal (VPT) connected to, and in communication with, the VIST, the VPT for receiving the menu from the menu means, the VPT further connected to, and in communication with one of a telephone network and a computer network for allowing the subscriber to access the subscriber voice mailbox to modify the one or more parameters through the menu.

5. The system of claim 1, wherein:

the VISP system further comprises a subscriber voice mailbox, the subscriber voice mailbox including one or more parameters indicating subscriber preferences, and a menu means for allowing a subscriber to modify the one or more parameters, the menu means including a voice menu; and the voice paging network is a two-way voice paging network, the voice paging network for receiving a menu from the menu means and distributing the voice menu to the subscriber's voice pager, such that the subscriber may access the subscriber voice mailbox to modify the one or more parameters through the voice menu.

6. A method for distributing a voice information service message (VISM) from a voice information services provider (VISP) to a subscriber through the subscriber's voice pager, the method comprising:

receiving, at a voice information service terminal (VIST), a VISM from the VISP;

converting the VISM into a voice page;

sending the voice page from the VIST to a voice paging terminal (VPT) of a commercial voice paging network that can be accessed by a caller through a standard telephone carrier and a standard telephone system interface, the VIST having a direct connection to the commercial voice paging network such that the VIST is not required to access the commercial voice paging network through a standard telephone carrier and a standard telephone system interface;

determining a voice paging base station (VPBS) for transmitting the voice page to the subscriber;

sending the voice page to the determined VPBS; and transmitting the voice page to the subscriber's voice pager.

7. A method for distributing information to a subscriber through a voice paging network to the subscriber's voice pager comprising:

collecting, by a voice information services provider (VISP), information for distribution to the subscriber;

recording the information as a voice information service message (VISM);

converting the VISM into a voice page;

sending the voice page to a voice paging terminal (VPT) of a commercial voice paging network that can be accessed by a caller through a standard telephone carrier and a standard telephone system interface, the VIST having a direct connection to the commercial voice paging network such that the VIST is not required to access the commercial voice paging network through a standard telephone carrier and a standard telephone system interface;

determining a voice paging base station (VPBS) for transmitting the voice page to the subscriber;

sending the voice page to the determined VPBS; and transmitting the voice page to the subscriber's voice pager.

8. The method of claim 7, further comprising simulating, at the VISP, how the VISM will sound as a voice page through the subscriber's voice pager.

9. The method of claim 7, further comprising:

receiving, at the VPBS, a menu request from the subscriber's voice pager;

downloading a menu from the VISP;

transmitting the menu to the subscriber's voice pager;

receiving a menu selection from the subscriber's voice pager;

sending the menu selection to the VISP; and updating a profile for the subscriber with the menu selection.

10. The method of claim 9, wherein the menu comprises a voice menu.

11. The method of claim 9, wherein the menu comprises a visual menu.

12. The method of claim 7, further comprising:

allowing a subscriber to access the VPT through a telephone;

playing a voice menu to the subscriber through the telephone;

receiving menu selections from the subscriber through the telephone; and updating a profile for the subscriber with the menu selection.

13. The method of claim 7, further comprising:

allowing a subscriber to access the VPT through a computer network;

presenting a menu to the subscriber through the computer network;

receiving menu selections from the subscriber through the computer network; and updating a profile for the subscriber with the menu selection.

* * * * *

UNITED STATES PATENT AND TRADEMARK OFFICE
CERTIFICATE OF CORRECTION

PATENT NO. : 6,253,062 B1
DATED : June 26, 2001
INVENTOR(S) : R.R. Leyendecker

It is certified that error appears in the above-identified patent and that said Letters Patent is hereby corrected as shown below:

<u>Title page,</u>
Item [56], References Cited, U.S. PATENT DOCUMENTS, insert in appropriate order the following:

| | | |
|---|---|---|
| -- 5,694,455 | 12/1997 | Goodman |
| 5,745,551 | 4/1998 | Strauch et al. |
| 5,802,466 | 9/1998 | Gallant et al. |
| 5,960,064 | 9/1999 | Foladare et al. |
| 3,996,554 | 12/1976 | Ives et al. |
| 4,644,351 | 2/1987 | Zabarsky et al. |
| 4,885,577 | 12/1989 | Nelson |
| 4,916,539 | 4/1990 | Galumbeck |
| 5,043,718 | 8/1991 | Shimura |
| 5,131,020 | 7/1992 | Liebesny et al. |
| 5,173,691 | 12/1992 | Sumner |
| 5,182,555 | 1/1993 | Sumner |
| 5,206,641 | 4/1993 | Grant et al. |
| 5,260,986 | 11/1993 | Pershan |
| 5,504,476 | 4/1996 | Marrs et al. |
| 5,612,682 | 3/1997 | DeLuca et al. -- |

Signed and Sealed this

Twenty-sixth Day of November, 2002

Attest:

Attesting Officer

JAMES E. ROGAN
Director of the United States Patent and Trademark Office